(12) United States Patent
Sasaki et al.

(10) Patent No.: US 6,794,451 B2
(45) Date of Patent: Sep. 21, 2004

(54) CATIONICALLY POLYMERIZABLE LIQUID COMPOSITION AND TACKY POLYMER

(75) Inventors: Hiroshi Sasaki, Aichi (JP); Koutarou Yoneda, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 24 days.

(21) Appl. No.: 10/072,869

(22) Filed: Feb. 12, 2002

(65) Prior Publication Data

US 2002/0156190 A1 Oct. 24, 2002

(30) Foreign Application Priority Data

Feb. 13, 2001 (JP) ........................................ 2001-034812

(51) Int. Cl.$^7$ ..................... C08L 53/00; C08L 63/00; C08L 71/02
(52) U.S. Cl. ................. 525/92 R; 525/403; 525/407; 525/410; 525/523; 528/408; 528/411; 528/412; 528/416; 528/417; 528/418; 528/419; 528/421
(58) Field of Search ............................ 525/92 R, 403, 525/407, 410, 523, 524; 528/408, 411, 412, 416, 417, 418, 419, 421, 409

(56) References Cited

U.S. PATENT DOCUMENTS 4,670,519 A * 6/1987 Mueller ....................... 525/342

FOREIGN PATENT DOCUMENTS

| EP | 0 848 294 A1 | 6/1998 |
|---|---|---|
| EP | 1 138 739 A1 | 10/2001 |
| JP | 5-78639 | 3/1993 |
| JP | 5-171083 A * | 7/1993 |
| JP | 5-171084 A * | 7/1993 |
| JP | 7-53711 A * | 2/1995 |
| JP | 7-62082 A * | 3/1995 |
| JP | 7-126565 A * | 5/1995 |
| JP | 8-60127 | 3/1996 |
| JP | 8-277385 | 10/1996 |
| JP | 9-40760 A2 * | 2/1997 |
| JP | 9-291267 A2 * | 11/1997 |
| JP | 9-328651 A2 * | 12/1997 |
| JP | 10-158581 A * | 6/1998 |
| JP | 11-80681 | 3/1999 |
| JP | 11-80681 A2 * | 3/1999 |
| JP | 11-140279 A * | 5/1999 |
| JP | 11-152441 A * | 6/1999 |
| JP | 11-158437 | 6/1999 |
| JP | 11-166168 | 6/1999 |
| JP | 2000-26830 | 1/2000 |
| JP | 2000-290619 A2 * | 10/2000 |
| JP | 2001-11424 A2 * | 1/2001 |
| WO | WO 99/05181 A1 * | 2/1999 |
| WO | WO 00/63272 A1 | 10/2000 |

OTHER PUBLICATIONS

Googie Online: "Probe Tack Experiment," 2004, 2 pages.*
Technical Bulletin for Shell Chemical Comoany, 1996, Kraton EKP 206 and EKP 207, 6 pages.*
Frances et al., "New developments in the field of cationic photocrosslinking of epoxy resins with borates photoinitiators," RadTech '98 North America UV/EB Conference Proceedings, Chicago, Apr. 19–22, 1998, pp. 476–485.*
Sasaki, "Photo–curable pressure sensitive adhesives using alkyl oxetane," Polymer Preprints, 2001, vol. 42, No. 2, pp. 731–732.*
Eric–Jack Gerard and Jurgen Schneider, Reactive Polymers for UV Curable Pressure Sensitive Adhesives (PSA's), Rad. Tech. Europe, vol. 97, pp. 175–180 (1997).
Patent Abstracts of Japan—11080681 (Mar. 26, 1999).
Patent Abstracts of Japan—11140279 (May 25, 1999).
Patent Abstracts of Japan—10168120 (Jun. 23, 1998).

* cited by examiner

Primary Examiner—Robert Sellers
(74) Attorney, Agent, or Firm—Sughrue Mion, PLLC

(57) ABSTRACT

A cationically polymerizable liquid composition is formed from a cationically polymerizable mixture (A) and a solid resin (B) that is compatible with the mixture (A) at room temperature and has a softening point of at least 40° C., so that the composition has a viscosity at 25° C. of 20 Pa·sec or below. The cationically polymerizable mixture (A) is formed from a monofunctional monomer (A-1) having in the molecule only one cyclic ether structure represented by formula (1) below, a polyfunctional monomer (A-2) having in the molecule at least two cyclic ether structures represented by formula (1) below, and a latent cationic polymerization initiator (A-3). A tacky polymer formed by cationic polymerization of the composition is also disclosed.

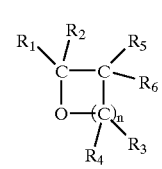

(1)

(In formula (1), n denotes 0, 1, or 2, and $R_1$ to $R_6$ independently denote hydrogen atoms or hydrocarbon groups, which may have a substituent.)

16 Claims, No Drawings

CATIONICALLY POLYMERIZABLE LIQUID COMPOSITION AND TACKY POLYMER

BACKGROUND OF THE INVENTION

1. Field of the Invention

The present invention relates to a cationically polymerizable liquid composition that, without containing an organic solvent, can be coated easily on a substrate and can be polymerized by light or heat after the coating so that it can be used as a pressure-sensitive adhesive having good tack properties. The present invention also relates to a tacky polymer that can be obtained by cationic polymerization of the above-mentioned cationically polymerizable liquid composition.

2. Description of the Related Art

With regard to conventional pressure-sensitive adhesives, a solvent type in which a rubber or acrylic material is dissolved in an organic solvent, and an emulsion type in which the material is dispersed in water have been used. Currently, solvent type pressure-sensitive adhesives are most widely used, but the release of the organic solvent has become an issue recently. The emulsion type has the drawbacks of poor water resistance, long drying time, etc. A hot-melt type, which has been proposed as a method for resolving the above-mentioned problems, still has poor coating performance, poor tack properties and, in particular, poor heat resistance.

Recently, a solvent-free liquid curable pressure-sensitive adhesive has been proposed that is formed mainly from a polymerizable monomer, and a large number of proposals have been made regarding a radically photocurable solvent-free liquid composition employing a radically polymerizable acrylate. However, since it is difficult to complete the radical polymerization in air due to the polymerization inhibiting effect of oxygen, the remaining monomer causes problems such as an unpleasant odor and skin irritation. In order to improve the above-mentioned polymerization, it has been proposed that irradiation with light should be carried out under an atmosphere of nitrogen, but the equipment cost is too high.

A large number of cationically photopolymerizable compositions have been proposed as having good photopolymerization properties in air. For example, JP-A-5-78639 (JP-A denotes Japanese unexamined patent application publication) discloses a pressure-sensitive adhesive comprising a polymer obtained by the copolymerization of acrylic vinyl monomers having a hydroxy group, a bi- or poly-functional epoxy compound, and a cationic polymerization initiator. JP-A-8-60127 discloses a UV curable hot-melt pressure-sensitive adhesive composition comprising a cyclohexene monoepoxide group-containing thermoplastic acrylic polymer, a polyol, and a cationic polymerization photoinitiator. JP-A-11-166168 discloses an acrylic pressure-sensitive adhesive composition comprising an acrylic oligomer obtained by polymerizing specified monomer components, and a cationic photocatalyst. However, since all of these compositions have low polymerizability, a large amount of light is needed when they are cured at room temperature, and the low polymerizability might cause a problem in practice. It is surmised that, since these compositions contain an ester group ascribable to the acrylic group, the presence of the ester group retards the ring-opening polymerization of the cyclic ether, thereby lowering the polymerizability. Furthermore, when the acrylic oligomer has a high molecular weight, the composition becomes highly viscous, thus making it difficult to coat the composition.

In order to avoid the retardation in polymerization due to the ester group, a cationically photopolymerizable composition has been disclosed (Eric-Jack Gerard and Jurgen Schneider, Rad. Tech. Europe 97, 175, 1997), the composition employing a material into which an epoxy group had been incorporated by oxidation of a block polymer having an unsaturated bond in its main chain. JP-A-2000-26830 discloses a UV curable pressure-sensitive adhesive composition formed by mixing a specified epoxy compound, a compound having a functional group that reacts with an epoxy group, a compound having rubber elasticity, and a cationically curing catalyst. However, all of the compositions are very highly viscous; it is proposed in the former that the composition is heated during coating, and in the latter that a solvent is used.

JP-A-11-80681 discloses a foamed pressure-sensitive adhesive tape employing a cationically photoreactive oligomer type pressure-sensitive adhesive composition. Only two types of the composition are disclosed, one of which is the same as that above disclosed by Gerard, et al. and is highly viscous so that it is difficult to coat. The other composition is the same as one disclosed in JP-A-11-166168, and it can be easily expected that its curing speed will be low.

JP-A-11-158437 discloses an adhesion method wherein a pressure-sensitive adhesive material containing a cationically polymerizable compound and a cationic photopolymerization initiator is discharged from a head of an ink-jet printer, coated, and then polymerized by irradiation with light. Although the composition disclosed in the example of the above-mentioned publication has low viscosity, since its polymerizability is low and little polymerization takes place with the level of irradiation described in the publication, it is of no practical utility.

As hereinbefore described, among the solvent-free liquid curable pressure-sensitive adhesives reported so far, there are no reports of a pressure-sensitive adhesive that has ease of coating, can be rapidly polymerized in air and can form a coating of the pressure-sensitive adhesive having good tack properties by irradiation with light.

BRIEF SUMMARY OF THE INVENTION

The present invention has been carried out in view of the above-mentioned circumstances.

It is an object of the present invention to provide a novel cationically polymerizable liquid composition that has ease of coating and high polymerizability in air, and can give a tacky coating having excellent tack properties such as adhesion, holding power, and tack after cationic polymerization. It is another object of the present invention to provide a tacky polymer having excellent tack properties such as adhesion and holding power.

As a result of an intensive investigation by the present inventors in order to achieve ease of coating, high polymerizability in air, and good tack properties after polymerization, the present invention has been accomplished. That is to say, the above-mentioned objects can be realized by a low viscosity cationically polymerizable liquid composition comprising a polymerizable mixture (A) comprising a monofunctional monomer, a polyfunctional monomer and a latent cationic polymerization initiator, the monomers having as a cationically polymerizable group in the molecule a cyclic ether having ring-opening polymerizability; and a solid resin (B) having compatibility with the polymerizable mixture (A). The solid resin (B) here preferably has a softening point of at least 40° C. The above-mentioned 'low viscosity' means that the viscosity at 25° C. is 20 Pa·sec or below.

One aspect of the present invention relates to a cationically polymerizable liquid composition, which is a liquid resin having a viscosity at 25° C. of 20 Pa·sec or below, comprising a cationically polymerizable mixture (A) comprising a monofunctional monomer (A-1) having only one cyclic ether structure represented by formula (1) below in the molecule (hereinafter, also simply called 'monofunctional monomer'), a polyfunctional monomer (A-2) having in the molecule at least two groups derived from a cyclic ether structure represented by formula (1) below (hereinafter, also simply called 'polyfunctional monomer'), and a latent cationic polymerization initiator (A-3); and a solid resin (B) that is compatible with the above-mentioned mixture (A) at room temperature and has a softening point of at least 40° C.

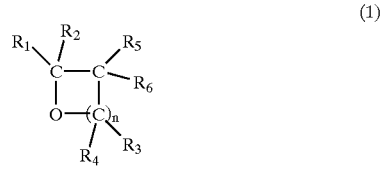

(1)

In the formula, n denotes 0, 1, or 2, and $R_1$ to $R_6$ independently denote hydrogen atoms or hydrocarbon groups, which may have a substituent.

Another aspect of the present invention relates to a tacky polymer that can give excellent tack properties and a polymerizable liquid composition for a tacky polymer, which are obtained by adjusting, so as to be in a specified range, the viscoelastic characteristics of a polymer that is obtained by cationic polymerization of the above-mentioned cationically polymerizable liquid composition.

The above-mentioned objects, other objects, features, and advantages of the invention will become clear from the following description.

DETAILED DESCRIPTION OF THE INVENTION

The cationically polymerizable liquid composition of the present invention and the tacky polymer obtained by polymerization of the above-mentioned composition are explained in detail below.

Cationically Polymerizable Mixture (A)

A cationically polymerizable mixture (A) contains three essential components. These are a monofunctional monomer (A-1) having in the molecule only one cyclic ether structure having ring-opening polymerizability and represented by the aforementioned formula (1), a polyfunctional monomer (A-2) having in the molecule at least two cyclic ether structures represented by the aforementioned formula (1), and a latent cationic polymerization initiator (A-3). The cationically polymerizable mixture preferably contains a compound having at least two alicyclic epoxy groups as polyfunctional monomer (A-2) in order to further obtain excellent adhesive holding power at high temperature. The 'alicyclic epoxy groups' will be explained in detail later. It is also preferable to add a compound having a terminal hydroxy group (explained later) as an optional component.

The above-mentioned components of the cationically polymerizable mixture (A) are explained in more detail below.

Monofunctional Monomer (Component A-1)

The monofunctional monomer is a compound having only one cyclic ether structure in the molecule. A compound having at least two cyclic ether structures is classified as a polyfunctional monomer (A-2) below. The monofunctional monomer is used in order to control the viscosity of the polymerizable liquid composition and the glass transition temperature of a polymer that is obtained by polymerizing the composition.

The viscosity of the monofunctional monomer used as the component A-1 is preferably 20 mPa·sec or below at 25° C. However, the viscosity of the monofunctional monomer itself is not particularly limited as long as the liquid composition finally obtained has a viscosity at 25° C. of 20 Pa·sec or below.

The monofunctional monomers can be classified roughly into compounds having a three-membered epoxy ring, those having a four-membered oxetanyl ring, those having a five-membered tetrahydrofurfuryl ring, etc., represented by formulae (4) to (6) below. The epoxy group represented by formula (4) includes an alicyclic epoxy group having a structure obtained by epoxidizing a cyclopentene group or a cyclohexene group.

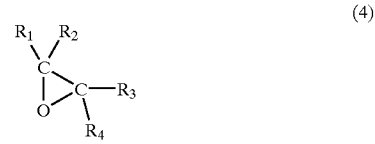

(4)

In formula (4), $R_1$ to $R_4$ independently denote hydrogen atoms or hydrocarbon groups, which may have a substituent, and $R_1$ and $R_3$ may bond to each other to form, together with the carbon atoms to which they are bonded, an alicyclic group (preferably a cyclohexane ring or a cyclopentane ring). The substituents that are introduced into the above-mentioned hydrocarbon groups do not include any of the cyclic ether structures represented by formula (1). This applies also to formulae (5) and (6) below.

With regard to the hydrocarbon groups, alkyl groups or aryl groups having 1 to 36 carbon atoms (these are also described as '$C_1$ to $C_{36}$' in the present invention) are preferable, and $C_1$ to $C_{24}$ alkyl groups or aryl groups are more preferable; with regard to the aryl groups, phenyl groups and naphthyl groups are preferable. With regard to the substituents of the hydrocarbon groups, any substituent is allowed as long as it does not interfere with the cationic polymerization, and a substituent that does not adversely affect the cationic polymerization is preferable.

Examples of the above-mentioned substituents of the alkyl groups include $C_1$ to $C_{12}$ alkoxy groups, $C_2$ to $C_{12}$ acyloxy groups, $C_2$ to $C_{12}$ alkoxycarbonyl groups, phenyl groups, benzyl groups, benzoyl groups, benzoyloxy groups, halogen atoms, cyano groups, nitro groups, phenylthio groups, hydroxy groups and triethoxylsilyl groups.

Examples of the above-mentioned substituents of the aryl groups include $C_1$ to $C_{12}$ alkyl groups, $C_2$ to $C_{12}$ alkoxy groups, $C_2$ to $C_{12}$ acyloxy groups, alkoxycarbonyl groups, phenyl groups, benzyl groups, benzoyl groups, benzoyloxy groups, halogen atoms, cyano groups, nitro groups, phenylthio groups, hydroxy groups and triethoxylsilyl groups.

(5)

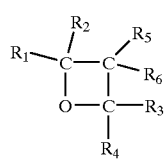

In formula (5), $R_1$ to $R_6$ denote hydrogen atoms or hydrocarbon groups, which may have a substituent.

With regard to the hydrocarbon groups, $C_1$ to $C_{36}$ alkyl groups or aryl groups are preferable, and $C_1$ to $C_{24}$ alkyl groups or aryl groups are more preferable; with regard to the aryl groups, phenyl groups and naphthyl groups are preferable. With regard to the substituents of the hydrocarbon groups, any substituent is allowed as long as it does not interfere with the cationic polymerization, and a substituent that does not adversely affect the cationic polymerization is preferable. Examples of substituents that are allowed in the hydrocarbon groups are the same as those cited as examples of the substituents of $R_1$ to $R_4$ in formula (4) when $R_1$ to $R_4$ are alkyl groups or aryl groups.

(6)

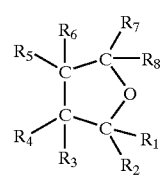

In formula (6), $R_1$ to $R_8$ denote hydrogen atoms or hydrocarbon groups, which may have a substituent.

With regard to the hydrocarbon groups, $C_1$ to C36 alkyl groups or aryl groups are preferable, and $C_1$ to $C_{24}$ alkyl groups or aryl groups are more preferable; with regard to the aryl groups, phenyl groups and naphthyl groups are preferable. With regard to the substituents of the hydrocarbon groups, any substituent is allowed as long as it does not interfere with the cationic polymerization, and a substituent that does not adversely affect the cationic polymerization is preferable. Examples of substituents that are allowed in the hydrocarbon groups are the same as those cited as examples of the substituents of $R_1$ to $R_4$ in formula (4) when $R_1$ to $R_4$ are alkyl groups or aryl groups.

Among these monomers, it is preferable in the present invention to use a monofunctional monomer in which any one of $R_1$ to $R_6$ in the above-mentioned formula (1) is a substituent that includes a group represented by formula (2) below. That is to say, a substituent that includes a group represented by formula (2) can be chosen preferably as the hydrocarbon group in formulae (4) to (6).

(2)

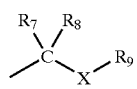

In formula (2), $R_7$ and $R_8$ independently denote hydrogen atoms or alkyl groups, which may have a substituent; the number of carbon atoms in the alkyl groups is preferably 1 to 24, and more preferably 1 to 10. $R_9$ is a straight- or branched-chain alkyl group that has at least 4 carbon atoms, and preferably 4 to 24 carbon atoms, and may have a substituent. X denotes —$CH_2$ or, preferably, an oxygen atom.

With regard to a substituent that can be introduced into the alkyl groups represented by $R_7$ to $R_9$, any substituent is allowed as long as it does not interfere with the cationic polymerization, and a substituent that does not adversely affect the cationic polymerization is preferable. Examples of substituents that are allowed in the alkyl groups are the same as those cited as examples of the substituents of $R_1$ to $R_4$ in formula (4) when $R_1$ to $R_4$ are alkyl groups.

In the present invention, the monofunctional monomer (A-1) is particularly preferably a cyclic ether represented by formula (3) below.

(3)

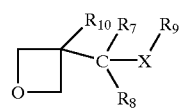

In formula (3), $R_7$, $R_8$ and $R_{10}$ denote hydrogen atoms or $C_1$ to $C_{10}$ alkyl groups, which may have a substituent, $R_9$ denotes a straight- or branched-chain $C_4$ to $C_{24}$ alkyl group, and X denotes an oxygen atom.

It is preferable for $R_9$ to be a $C_4$ to $C_{24}$ alkyl group, which may have a substituent, or a $C_6$ to $C_{16}$ straight- or branched-chain alkyl group. Examples of substituents that are allowed in the alkyl group are the same as those cited as examples of the substituents of $R_1$ to $R_4$ in formula (4) when $R_1$ to $R_4$ are alkyl groups.

Specific examples of the compound represented by formula (3) include OXT-212 in which $R_7$=$R_8$=H, $R_{10}$=ethyl, $R_9$=2-ethylhexyl, and X=oxygen, and OXR-12, which is represented by formula (7) below (manufactured by Toagosei Co., Ltd.).

(7)

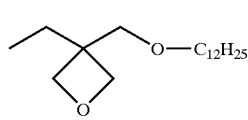

Since component A-1 has a comparatively low molecular weight, if there is a large amount of component A-1 remaining in a tacky polymer after polymerization, there is the problem that an unpleasant odor, etc. might occur. Since the use of a monofunctional monomer having an oxetane ring having high cationic polymerizability can control such a problem to a great extent, it is particularly preferable to use a monofunctional monomer of the oxetane type represented by the above-mentioned formulae (3), (5) and (7) as component A-1.

Polyfunctional Monomer (Component A-2)

Component A-2 is a polyfunctional monomer having in the molecule at least two cyclic ether structures, which correspond to the cyclic structure in the above-mentioned formula (1). This component is used in order to adjust the viscosity of the cationically polymerizable liquid composition and the tack properties of the polymer obtained by cationic polymerization, that is to say, the complex modulus of elasticity of the polymer. A connecting group for connecting said at least two cyclic ether structures can be chosen appropriately.

The viscosity of the polyfunctional monomer itself, which is used as component A-2, is not particularly limited as long as the viscosity of the cationically polymerizable liquid composition prepared using the polyfunctional monomer is 20 Pa·sec or below.

It is preferable for the cyclic ether structures of the polyfunctional monomer to be the three-membered epoxy rings, four-membered oxetanyl rings, or five-membered tetrahydrofurfuryl rings that are mentioned above in the explanation of the monofunctional monomer. With regard to specific chemical structures of the cyclic ether groups of the polyfunctional monomer, there can be cited cyclic ether structures obtained by removing one hydrogen atom or any residue from among the hydrogen atoms and hydrocarbon groups connected to the carbon atoms forming the rings in the chemical structures represented by the aforementioned formulae (4) to (6). The polyfunctional monomer having 'n' cyclic ether groups (n denotes an integer of 2 or above) in the molecule has a chemical structure in which such cyclic ether groups are each bonded via a single bond through an n-valent organic residue.

Specific examples of component A-2 include those generally known as epoxy resins such as bisphenol A epoxy resins, bisphenol F epoxy resins, novolac epoxy resins and alicyclic epoxy resins, and EKP-206 and EKP-207 (both trade names; manufactured by Kraton Polymers), which are produced by introducing an epoxy group by oxidizing a block polymer having an unsaturated bond in its main chain, the block polymer being produced commercially by anionic polymerization of an ethylene compound and a diene compound such as butadiene. EKP-206 and EKP-207 are an epoxidized polyisoprene/poly(ethylene/butylene/styrene) and an epoxidized polyisoprene/poly(ethylene/butylene), respectively. The examples further include OXT-121 and OXT-221 (both trade names; manufactured by Toagosei Co., Ltd.), which are oxetane compounds having at least two four-membered cyclic ether oxetanyl groups in their molecules. However, the present invention is not limited by these examples.

An alicyclic epoxy compound used as component A-2 is a component that is effective in maintaining a high complex modulus of elasticity at high temperature. Its viscosity is not particularly limited as long as the viscosity of the composition that is finally obtained is 20 Pa·sec or below.

The alicyclic epoxy compound is a compound having at least two, and preferably 2 to 8, alicyclic epoxy groups in the molecule. An alicyclic epoxy group can be obtained by epoxidizing a cycloolefin. Specific examples of the alicyclic epoxy compound include commercial products such as Epikote 171 (trade name; manufactured by Yuka Shell Epoxy K. K.), Araldite CY178 (trade name; manufactured by Asahi-Ciba Ltd.), Chissonox 206 and Chissonox 205 (both trade names; manufactured by Chisso Corp.), and Celoxide 2021, Epolead GT301, Epolead GT302, Epolead GT401 and Epolead GT403 (all trade names; manufactured by Daicel Chemical Industries, Ltd.).

As the alicyclic epoxy compound, 3,4-epoxycyclohexylmethyl-3',4'-epoxycyclohexanecarboxylate is particularly preferable.

The total amount of components A-2 is preferably in the range of 5 to 50 parts by weight relative to 100 parts by weight of the total amount of component A-1 and components A-2, and more preferably in the range of 10 to 40 parts by weight. When the total amount of components A-2, which are cross-linking components, is less than 5 parts by weight, the complex modulus of elasticity of the polymer obtained tends to be low, whereas the complex modulus of elasticity tends to become too high when the amount exceeds 50 parts by weight. There is as a result a high possibility that the complex modulus of elasticity might go outside the preferable range that is defined in the present invention.

The mixing proportion of the alicyclic epoxy compound used as component A-2 is not particularly limited as long as the complex modulus of elasticity of the polymer is in the preferable range. However, it is preferable for it to be added at 1 to 30 parts by weight relative to 100 parts by weight of the total amount of component A-1 and components A-2, and more preferably 2 to 20 parts by weight.

Cationic Polymerization Initiator (Component A-3)

The latent cationic polymerization initiator is a compound that can be activated by light or heat (hereinafter, called 'photo-latent' and 'thermo-latent' respectively) to generate an acid component and functions so as to induce the cationic ring-opening polymerization of a group capable of ring-opening polymerization in the composition.

With regard to a cationic polymerization initiator having photo-latent properties, any cationic photopolymerization initiator can be used as long as the polymerizable liquid composition of the present invention can be activated by irradiation with light, thereby inducing the ring opening of a group capable of ring-opening polymerization. Examples of the cationic photopolymerization initiator include onium salts and organometallic complexes. The light that can be used for the activation is preferably ultraviolet light. It is also possible to combine a photosensitizer with the initiator, thereby activating the composition of the present invention with short wavelength visible light having a wavelength of 390 to 500 nm.

Examples of the onium salt used as the photopolymerization initiator include diazonium salts, sulfonium salts and iodonium salts. Examples of the organometallic complex include an iron-allene complex, a titanocene complex and an allylsilanol-aluminum complex. It is also possible to use commercial products such as Optomer SP-150 (trade name; manufactured by Asahi Denka Kogyo K. K.), Optomer SP-170 (trade name; manufactured by Asahi Denka Kogyo K. K.), UVE-1014 (trade name; manufactured by General Electric Company), CD-1012 (trade name; manufactured by Sartomer Company, Inc.), and Rhodorsil 2074 (trade name; manufactured by Rhodia Inc.), which is (4-isopropylpheny)(4-methylphenyl)iodonium tetrakis(pentafluorophenyl) borate.

With regard to the cationic polymerization initiator having thermo-latent properties, any cationic thermopolymerization initiator can be used as long as it can be activated by heating and can induce the ring opening of a group capable of ring-opening polymerization. Examples thereof include various types of onium salt such as quaternary ammonium salts, phosphonium salts and sulfonium salts, and organometallic complexes. As the above-mentioned onium salts, for example, commercial products such as Adeka Opton CP-66 and Adeka Opton CP-77 (both trade names; manufactured by Asahi Denka Kogyo K. K.), San-aid SI-60L, San-aid SI-80L and San-aid SI-100L (all trade names; manufactured by Sanshin Chemical Industry Co., Ltd.) and the CI series (manufactured by Nippon Soda Co., Ltd.) can be used. Examples of the organometallic complexes include alkoxysilane-aluminum complexes.

The mixing ratio of the above-mentioned latent cationic polymerization initiator (A-3) is preferably in the range of 0.01 to 5 parts by weight relative to 100 parts by weight of the total amount of component A-1 and components A-2. When the mixing ratio of the latent cationic polymerization initiator is less than 0.01 parts by weight, there are cases where the ring-opening reaction of a group capable of ring-opening polymerization cannot be carried out sufficiently even by activation using the action of light or heat, and the tack properties of the polymer so obtained might be inadequate. When the initiator is added at more than 5 parts by weight, the effect of promoting the polymerization cannot be further enhanced, and the initial tack strength might even be degraded. Solid Resin (B)

The solid resin (B) is a tack-imparting resin (tackifier) that itself has a softening point of at least 40° C., is compatible with the above-mentioned cationically polymerizable mixture (A) at room temperature, and is a component that adjusts the viscoelastic characteristics of the polymer. Adding the solid resin (B) to the cationically polymerizable mixture (A) can reduce the complex modulus of elasticity at low frequency (e.g., ca. 1 Hz) and can increase the complex modulus of elasticity at high frequency (e.g., ca. 100 Hz). A compound that is generally known as a tackifier can be used.

With regard to the solid resin (B), a solid resin that is generally know as a tackifier and has a comparatively low molecular weight and a high softening point can be used. For example, a tackifier such as a rosin resin, a modified rosin resin, a hydrogenated rosin resin, a terpene resin, a terpene phenol resin, an aromatic modified terpene resin, a $C_5$ or $C_9$ petroleum resin and a hydrogenated derivative thereof, or a chroman resin can be used. However, the solid resin (B) is not particularly limited by the above-mentioned resins as long as it is compatible with the aforementioned cationically polymerizable mixture (A) at room temperature and has a softening point of at least 40° C.

Among the above-mentioned resins, a hydrogenated rosin resin and a hydrogenated petroleum resin are preferable in terms of their excellent compatibility with the cationically polymerizable mixture (A), improved transparency of the pressure-sensitive adhesive after curing, and their ability to exhibit a strong adhesive power.

The solid resin (B) is preferably used at 10 to 300 parts by weight relative to 100 parts by weight of the cationically polymerizable mixture (A), and particularly preferably 50 to 150 parts by weight. Other Optional Additives
(Compound Having Terminal Hydroxy Group)

The cationically polymerizable liquid composition of the present invention can contain a monool or polyol compound having a terminal hydroxy group.

Such a compound having a terminal hydroxy group is copolymerized into the polymer by a chain transfer reaction. When a compound having a hydroxy group at only one end of its straight chain is added, the cationic polymerization is terminated by the chain transfer reaction, and the hydroxy-containing compound is incorporated into the polymer chain. When a compound having hydroxy groups at both ends of its chain is added, since both terminal groups are incorporated into the polymer chain by chain transfer, it can function as a cross-linking chain. Adding a hydroxy-containing compound to the cationically polymerizable liquid composition in this way can adjust the viscosity of the composition and the viscoelasticity of the polymer after curing.

With regard to preferable hydroxy-containing compounds, diols and triols that are oligomers or polymers (hereinafter, simply called 'polymers') having a low glass transition temperature and a molecular weight in a specified range can be cited. The preferable range for the molecular weight is 300 to 10,000, more preferably 500 to 5,000, and particularly preferably 500 to 3,000. The atoms forming the main chain of the polymer are preferably carbon alone or carbon and oxygen. The number of atoms contained in the main chain connecting the two hydroxy groups is preferably 20 to 500, and more preferably 20 to 200.

The glass transition temperature of the above-mentioned polymer is preferably 0° C. or below.

Preferred specific examples of the polymer containing a terminal hydroxy group include, as a compound having a hydroxy group at one end, the branched olefin polymer L-1203 manufactured by Kraton Polymers and, as compounds having hydroxy groups at both ends, the hydrogenated polybutadienes GI-1000, 2000 and 3000 manufactured by Nippon Soda Co., Ltd.

The composition of the present invention can contain, in addition to the above-mentioned cationically polymerizable mixture (A) and solid resin (B), a known plasticizer, anti-aging agent, filler, etc. as appropriate in amounts that do not interfere with the objects of the present invention. In order to enhance the coating performance, a viscosity increasing agent such as an acrylic rubber, an epichlorohydrin rubber, an isoprene rubber or a butyl rubber, a thixotropic agent such as colloidal silica or polyvinylpyrrolidone, a filler such as calcium carbonate, titanium oxide or clay, etc. can be added.

With the aim of imparting high adhesive shear strength, it is possible to add hollow inorganic materials such as glass balloons, alumina balloons or ceramic balloons; organic spheres such as nylon beads, acrylic beads or silicone beads; hollow organic materials such as vinylidene chloride balloons or acrylic balloons; and filaments such as glass, polyester, rayon, nylon or cellulose. When adding the above-mentioned glass filaments, although it is possible to add fibrous chips to the composition, carrying out the polymerization by impregnating a woven glass with the above-mentioned photopolymerizable composition, etc. can achieve very high adhesive shear strength.

Each of components A-1 to A-3 that form the cationically polymerizable mixture (A), solid resin B and the aforementioned other additives can be one type of compound; or two or more different types of compound can be combined.

The measurement conditions for the various physical properties that are used in the examples of the present invention and their preferable ranges are described below.
Viscosity The viscosity of the cationically polymerizable liquid composition is 20 Pa·sec or below at 25° C. When the composition has a higher viscosity than the above-mentioned range, it becomes difficult to coat at room temperature and heating is required in some cases. Since heating a latent cationically polymerizable composition generally degrades its stability and increases the viscosity, heating is not desirable. In order to obtain good coating performance, the viscosity at 25° C. is preferably 10 Pa·sec or below.
Viscoelastic Characteristics The complex modulus of elasticity of the polymer in the present invention is a value based on the result of a measurement obtained by a viscoelasticity measurement method using shear stress.

The complex modulus of elasticity (G*) of the cationic polymer obtained by cationic polymerization of the composition of the present invention preferably has viscoelastic characteristics at 25° C. that satisfy the following conditions at each frequency.

G*>100,000 (measurement frequency: 0.1 Hz)
G*<4,000,000 (measurement frequency: 1 Hz)
G*>2,000,000 (measurement frequency: 100 Hz)

When a predetermined amount of an alicyclic epoxy compound is used as the aforementioned component A-2, the complex modulus of elasticity (G*) at a measurement frequency of 0.1 Hz at 100° C. satisfies the following condition.

G*>100,000 (measurement frequency: 0.1 Hz)

When the complex modulus of elasticity at 0.1 Hz of the polymer is less than 100,000, the cohesive strength of the polymer becomes undesirably low. When the polymer is peeled off from an adherend, cohesive failure takes place, thereby causing a so-called 'glue residue'. An undesirable reduction in holding power might also occur in some cases. The complex modulus of elasticity at 0.1 Hz is more preferably 200,000 or above.

When the complex modulus of elasticity at 1 Hz is 4,000,000 or above, the polymer becomes hard and it undesirably shows no initial adhesion. It is more preferable for the complex modulus of elasticity at 1 Hz to be 3,000,000 or below.

When the complex modulus of elasticity at 100 Hz is less than 2,000,000, the tack value, which is essential for a pressure-sensitive adhesive, decreases. It is more preferable for the complex modulus of elasticity at 100 Hz to be 3,000,000 or above.

In order to obtain a high tack value it is preferable for the loss tangent (Tan δ) at 25° C. to be at least 0.8 (measurement frequency: 100 Hz), and more preferably at least 1.0.

Glass Transition Temperature

The glass transition temperature (Tg) used in the present invention is a value based on the results measured by a DSC measurement method defined by JIS (Japanese Industrial Standards) K 7121.

When the glass transition temperature of a cationic polymer obtained by polymerizing the composition of the present invention exceeds 0° C., it becomes difficult to maintain the above-mentioned viscoelastic characteristics, and it is therefore preferable for the glass transition temperature to be 0° C. or below, and more preferably −20° C. or below.

The polymerizable liquid composition of the present invention can be used for the production of a tacky polymer. When using the polymerizable liquid composition, for example, paper, plastic laminated paper, cloth, plastic laminated cloth, plastic film, metal foil, a foamed material, etc. is used as a support, the polymerizable liquid composition of the present invention is coated on one side or both sides of the support by an appropriate coating means such as a comma roll, a gravure coater, a roll coater, a kiss coater, a slot die coater, or a squeeze coater, the polymerization is effected by the application of heat or light, and a pressure-sensitive adhesive layer is formed so as to have a thickness of usually 10 to 500 μm per side to give a pressure-sensitive adhesive sheet in tape form, sheet form, etc.

There is no particular limitation on the light source that can be used for carrying out polymerization by irradiation with light. Light sources having an emission energy distribution that extends to a wavelength of 400 nm or below can be used. Examples thereof include a low-pressure mercury lamp, a medium-pressure mercury lamp, a high-pressure mercury lamp, a superhigh-pressure mercury lamp, a fluorescent lamp, a black light lamp, a microwave-excited mercury lamp and a metal halide lamp. The intensity of the light that irradiates the polymerizable liquid composition is controlled according to the target product and is not particularly limited, but it is preferable for the light intensity in the light wavelength region that is effective in activating the photo-latent initiator (depending on the photopolymerization initiator, but usually light at 300 to 420 nm) to be 0.1 to 100 mW/cm². When the intensity of light that irradiates the polymerizable liquid composition is less than 0.1 mW/cm², the reaction time becomes too long. When it exceeds 100 mW/cm², there is a possibility that the heat radiated from the lamp and the heat generated during polymerization of the composition might reduce the cohesive strength of the pressure-sensitive adhesive layer so obtained, yellow the layer, and degrade the support.

The duration for which the light irradiates the polymerizable liquid composition is controlled according to the target product and is not particularly limited, but it is preferable to set the duration so that the accumulated amount of light represented by the product of the intensity and the duration of the irradiation with light in the above-mentioned light wavelength region is 10 to 5,000 mJ/cm². When the accumulated amount of light that irradiates the above-mentioned polymerizable liquid composition is less than 10 mJ/cm², active species cannot be generated sufficiently from the photo-latent initiator, thereby raising the possibility that the tack properties of the pressure-sensitive adhesive layer so obtained might be degraded. When it exceeds 5,000 mJ/cm², the irradiation time becomes very long and it is disadvantageous in terms of productivity.

When polymerization is carried out using heat, the heat can be applied by a standard method to the cationically polymerizable liquid composition of the present invention, and the conditions therefor are not particularly limited.

The cationically polymerizable liquid composition of the present invention can, without containing a solvent, be coated easily on a substrate and can be used as a pressure-sensitive adhesive having good tack properties by the application of light or heat after coating. There is a high expectation that these novel pressure-sensitive adhesives that do not require an organic solvent to be removed will replace existing solvent type pressure-sensitive adhesives.

EXAMPLES

The present invention is explained in more detail below by reference to examples, but the present invention is in no way limited thereby.

Example 1

Oxetane monomer OXR-12 (manufactured by Toagosei Co., Ltd.) (component A-1) represented by the aforementioned formula (7), polyfunctional monomer EKP-207 (trade name; manufactured by Kraton Polymers; chemical structure described in Shell Chemical Company's Technical Bulletin (1966. 10. 28–30)) (component A-2), iodonium salt photo-latent cationic initiator 2074 (trade name; manufactured by Rhodia Inc.) (component A-3), and hydrogenated petroleum resin Regalite 1090 (trade name; manufactured by Hercules, Inc.) having a softening point of about 90° C. (component B) were uniformly mixed at 40° C. in the composition ratio (wt %) shown in Table 1 below to give a cationically polymerizable liquid composition.

The composition so obtained was coated on a 50 μm thick polyethylene terephthalate film (PET film) using a doctor blade so as to give a coating thickness of about 25 μm, and then irradiated with ultraviolet rays (135 mJ/cm²) by feeding it once at a conveyor speed of 10 m/min under a 120 W/cm² condenser type high-pressure mercury lamp (lamp height: 10 cm) thereby effecting cationic polymerization to form a pressure-sensitive adhesive layer and give a pressure-sensitive adhesive sheet.

In order to measure the viscoelastic properties, the composition was also poured on a sheet of polytetrafluoroethylene (Teflon, trademark, manufactured by DuPont) so as to give a thickness of 1 mm, polymerized under the same irradiation conditions as for preparation of the pressure-sensitive adhesive sheet, and then released from the Teflon sheet to give a polymer for evaluation.

Examples 2 to 10 and Comparative Examples 1 to 2

The compositions of Examples 2 to 10 and Comparative Examples 1 to 2 were obtained in the same manner as in Example 1 except that the compositional ratios were changed as shown in Table 1. Oxetane monomer OTX-212 corresponds to the aforementioned monofunctional monomer (component A-1). L-1203 (manufactured by Kraton Polymer) is a fully saturated monool having a molecular weight of 3,600 that is produced by hydrogenating a straight-chain poly(ethylene/butylene) having one terminal hydroxy group and does not correspond to component A-2 of the present invention. UVR-6110 (trade name; manufactured by Union Carbide Corp.) is 3,4-epoxycyclohexyl methyl-3',4'-epoxycyclohexanecarboxyl ate and corresponds to component A-2 of the present invention. Regalite 1125 (manufactured by Hercules, Inc.) is a hydrogenated petroleum resin having a softening point of about 125° C.

GI-1000 used in Examples 9 and 10 is a hydrogenated product of polybutadiene having a molecular weight of 1000 and hydroxy groups at both ends.

The above-mentioned compositions were used in the same manner as in Example 1 to give polymers for the measurement of viscoelasticity and pressure-sensitive adhesive sheets on PET film. In Comparative Example 2, since each component of the composition is highly viscous, the components other than the photo-latent initiator were dissolved at 100° C., and the photo-latent initiator was then dissolved at 80° C. When preparing a polymer for the measurement of viscoelasticity and a pressure-sensitive adhesive sheet on a PET film using the above-mentioned composition, the composition continued being heated at 80° C. so as to reduce the viscosity, and an obvious increase in viscosity was observed. Therefore, immediately after dissolving the initiator only the viscosity was measured, and the other evaluations were suspended.

TABLE 1

|  | Examples |  |  |  |  |  |  |  |  |  | Comp. |  |
| --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 |
| Oxetane OXR-12 | 80 | 76 | 74 | 80 | 80 | 80 | 70 | 70 |  |  | 80 |  |
| Oxetane OXT-212 |  |  |  |  |  |  |  |  | 63 | 63 |  |  |
| EKP-207 | 20 | 20 | 20 | 20 | 20 | 20 | 30 | 30 |  |  | 20 | 60 |
| GI-1000 |  |  |  |  |  |  |  |  | 20 | 20 |  |  |
| 2074 (Rhodia) | 1 | 1 | 1 | 1 | 1 | 1 | 1 | 1 | 1 | 1 | 1 | 1 |
| UVR-6110 |  | 4 | 6 |  |  |  |  |  | 12 | 12 |  |  |
| Regalite 1090 | 120 | 120 | 120 | 140 |  |  | 100 | 120 | 90 | 100 |  | 100 |
| Regalite 1125 |  |  |  |  | 60 | 67.5 |  |  |  |  |  |  |
| L-1203 |  |  |  |  |  |  |  |  | 5 | 5 |  | 40 |

The viscosity of the compositions prepared in the above-mentioned examples 1 to 10 and comparative examples 1 and 2, the glass transition temperature and the viscoelastic characteristics of the polymers, and the tack properties (tack strength, holding power, probe tack) of the pressure-sensitive adhesive sheets were measured by the methods below. The results from measurement of the viscosity and the viscoelasticity are given in Table 2, and the results from measurement of the tack properties are given in Table 3. In comparative example 2, since the viscosity increase occurred as described above, only the result from measurement of the viscosity is given.

(1) Viscosity measurement: the viscosity of a composition after mixing was measured at 25° C. using an E type viscometer.
(2) Viscoelasticity measurement: the complex modulus of elasticity in terms of sheer stress of the cationic polymer obtained from a composition was measured on a 1 mm thick polymer in an RDSII type viscoelastometer manufactured by Rheometrics, Inc.
(3) Glass transition temperature: the above-mentioned polymers were subjected to a DSC method in accordance with JIS K 7121.
(4) Tack strength: measured by a method in accordance with JIS Z 0237. A pressure-sensitive adhesive sheet was cut to a width of 25 mm, then bonded to an adherend (SUS sheet or polyethylene (PE) sheet) through an adhesion area of 25 mm×100 mm, and compression bonded by a double pass of a 2 kg roll. The peel strength at 180° was measured at 23° C. and 65% RH. The state of the pressure-sensitive adhesive remaining on the adherend after the peel strength measurement was examined; when the peel state was of the interfacial peel type, it was denoted by A, and when the pressure-sensitive adhesive remained on the adherend, it was determined that cohesive failure had taken place, and it was denoted by C.
(5) Holding power: a sample (25 mm width) cut out from the pressure-sensitive adhesive sheet was affixed to an SUS sheet through an adhesion area of 25 mm×25 mm and compression bonded by a double pass of a 2 kg roll. A 1 kg load was applied at 40° C. and 100° C. and the time taken for the sheet to peel off was measured as the holding time, which represented the holding power. When the sheet was held after 24 hours, the holding time was denoted by 'at least 24 hours', and the creep from the initial attachment position was also measured and the value recorded. With regard to the samples that had peeled off within 24 hours, the state of the pressure-sensitive adhesive remaining on the adherend after the measurement was examined; when the peel state was of the interfacial peel type, it was denoted by A, and when the pressure-sensitive adhesive remained on the adherend, it was determined that cohesive failure had taken place, and it was denoted by C.
(6) SAFT (shear adhesion failure temperature): an SUS sheet adhesive sample was prepared in the same manner as in the above-mentioned measurement of holding power, it was heated in an oven with a load of 500 g from room temperature to 205° C. at a rate of temperature increase of 0.4° C./min, and the temperature at which the sheet peeled off was measured. When the sheet was held after the temperature reached 205° C., it was denoted by 'at least 205° C.', and the creep from the initial attachment position was also measured and the value recorded. With regard to the samples that had peeled off, the state of the remaining pressure-sensitive adhesive was examined in the same manner as in the above-mentioned holding power measurement.
(7) Probe tack: the probe tack was measured in accordance with ASTM D 2979 under the following conditions.

Probe: 5 mm diameter SUS #400 polished surface
Load: 100 g/cm$^2$
Contact time: 1 sec
Probe speed: 1 cm/sec
Measurement was carried out five times per sample, and the average value is given.

TABLE 2

|  | Example | | | | | |
| --- | --- | --- | --- | --- | --- | --- |
|  | 1 | 2 | 3 | 4 | 5 | 6 |
| Viscosity (mPa·s) | 3900 | 4100 | 4300 | 6500 | 1000 | 1500 |
| Tg (°C.) | −29.9 | −27.2 | −23.1 | −26.3 | −42.1 | −39.8 |
| G*(25° C.) (0.1 Hz) | 2.4E + 05 | 4.4E + 05 | 5.6E + 05 | 2.0E + 05 | 4.5E + 05 | 4.3E + 05 |
| G*(25° C.) (1 Hz) | 5.2 E+ 05 | 8.0E + 05 | 1.1E + 06 | 7.1E + 05 | 6.0E + 05 | 6.4E + 05 |
| G*(25° C.) (100 Hz) | 6.2E + 06 | 5.3E + 06 | 5.1E + 06 | 7.3E + 06 | 2.1E + 06 | 2.2E + 06 |
| G*(100° C.) (0.1 Hz) | — | 4.0E + 05 | 5.2E + 05 | — | — | — |
| Tan δ (100 Hz) | 2.6 | 2.1 | 1.8 | 3.2 | 1.2 | 1.4 |

|  | Example | | | | Comparative | |
| --- | --- | --- | --- | --- | --- | --- |
|  | 7 | 8 | 9 | 10 | 1 | 2 |
| Viscosity (mPa·s) | 4400 | 7300 | 2100 | 2500 | 370 | 327000 |
| Tg (°C.) | −37.0 | −31.2 | −21.0 | −18.0 | −47.5 | — |
| G*(25° C.) (0.1 Hz) | 2.9E + 05 | 3.8E + 05 | 5.2E + 05 | 6.8E + 05 | 3.0E + 05 | — |
| G*(25° C.) (1 Hz) | 3.8E + 05 | 5.6E + 05 | 9.1E + 05 | 1.1E + 06 | 3.5E + 05 | — |
| G*(25° C.) (100 Hz) | 2.1E + 06 | 3.2E + 06 | 4.9E + 06 | 5.3E + 06 | 6.8E + 05 | — |
| G*(100° C.) (0.1 Hz) | — | — | — | — | — | — |
| Tan δ (100 Hz) | 1.6 | 2.2 | 1.9 | 2.2 | 0.6 | — |

TABLE 3

|  | Example | | | | | |
| --- | --- | --- | --- | --- | --- | --- |
|  | 1 | 2 | 3 | 4 | 5 | 6 |
| Adhesion (g/inch) | | | | | | |
| SUS | 1200, A | 700, A | 860, A | 1460, A | 550, A | 620, A |
| PE | 550, A | 450, A | 370, A | 640, A | 143, A | 170, A |
| Holding power (40° C.) (holding time, creep) | >24 hr 0 mm | >24 hr 0 mm | >24 hr 0 mm | >24 hr 0 mm | >24 hr 0 mm | >24 hr 0 mm |
| Holding power (100° C.) (holding time, creep) | — | >24 hr 0 mm | >24 hr 0 mm | — | — | — |
| SAFT (drop temperature, creep) | — | >205° C. 0 mm | >205° C. 0 mm | — | — | — |
| Probe tack (gf) | 755 | 574 | 434 | 503 | 621 | 513 |

|  | Example | | | Comparative | |
| --- | --- | --- | --- | --- | --- |
|  | 7 | 8 | 9 | 10 | 1 | 2 |
| Adhesion (g/inch) | | | | | | |
| SUS | 520, A | 1000, A | 960, A | 1300, A | 20, A | — |
| PE | 220, A | 375, A | 480, A | 620, A | 11, A | — |
| Holding power (40° C.) (holding time, creep) | >24 hr 0 mm | >24 hr 0 mm | >24 hr 0 mm | >24 hr 0 mm | >24 hr 0 mm | — |
| Holding power (100° C.) (holding time, creep) | — | — | >24 hr 0 mm | >24 hr 0 mm | — | — |
| SAFT (drop temperature, creep) | — | — | >205° C. 0 mm | >205° C. 0 mm | — | — |
| Probe tack (gf) | 557 | 532 | 483 | 386 | 53 | — |

As shown in Table 2, the compositions of Examples 1 to 10 and Comparative Example 1 had low viscosities, and they could easily be coated when preparing the pressure-sensitive adhesive sheets, whereas the composition of Comparative Example 2 had a high viscosity and it was difficult to coat at room temperature. When it was heated so as to reduce the viscosity, there was an obvious increase in viscosity, probably as a result of polymerization due to insufficient thermal stability.

As shown in Table 2, in the case of the composition of Comparative Example 1, which gave a polymer whose complex modulus of elasticity at 100 Hz was outside the preferable range of viscoelasticity defined in the present invention, the tack value greatly decreased, and as a result the tack strength was poor.

As is clear from the above-mentioned table 3, the pressure-sensitive adhesive compositions of Examples 1 to 10 all showed excellent tack properties and, in particular, good holding power. The peel state was of the interfacial peel type in all the examples, and there was no pressure-sensitive adhesive remaining on the adherends.

It has been found from the above-mentioned results that the compositions that satisfy the viscosity and viscoelastic characteristics defined as being preferable in the present invention can be easily coated on a substrate at room temperature and the polymers obtained by cationic polymerization have good tack properties.

Furthermore, it has been found that the compositions that gave a complex modulus of elasticity at 100° C. (measurement frequency 0.1 Hz) of more than 100,000 as shown in Examples 2 and 3 have excellent holding power, in particular at high temperature.

Although the present invention has been explained above by reference to preferred examples, the present invention can be modified in variety ways without departing from the scope and sprit of the present invention described in the appended claims.

What is claimed is:

1. A cationically polymerizable liquid composition comprising:
    a cationically polymerizable mixture (A) comprising:
        a monofunctional monomer (A-1) having in the molecule only one cyclic ether structure represented by formula (1) below, wherein n is 1;
        a polyfunctional monomer (A-2) having in the molecule at least two cyclic ether structures represented by formula (1) below, wherein n is 0, and A-2 is an epoxidized product of a block copolymer produced by anionic polymerization of an ethylene compound and a diene compound; and
        a latent cationic polymerization initiator (A-3); and
    a solid resin (B) that is a tackifier, is compatible with the above-mentioned mixture (A) at room temperature, has a softening point of at least 40° C., and is selected from the group consisting of a rosin resin, a modified rosin resin, a hydrogenated rosin resin, a terpene resin, a terpene phenol resin, an aromatic modified terpene resin, a $C_5$ or $C_9$ petroleum resin or a hydrogenated derivative thereof, and a chroman resin;
    the composition having a viscosity at 25° C. of 20 Pa·sec or below,

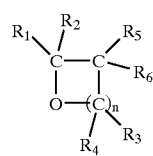

(1)

wherein,
    $R_1$ to $R_6$ independently denote hydrogen atoms or hydrocarbon groups, which may have a substituent, and
    the complex modulus of elasticity (G*) and the loss tangent (Tan δ) at 25° C. of the polymer obtained by cationic polymerization satisfy the following conditions,
        G*>100,000 (measurement frequency: 0.1 Hz),
        G*<4,000,000 (measurement frequency: 1 Hz),
        G*>2,000,000 (measurement frequency: 100 Hz), and
        Tan δ is at least 0.8 (measurement frequency: 100 Hz).

2. The cationically polymerizable liquid composition according to claim 1, wherein at least one of $R_1$ to $R_6$ in formula (1) is a substituent represented by formula (2) below,

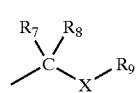

(2)

wherein,
    $R_7$ and $R_8$ denote hydrogen atoms or alkyl groups, which may have a substituent, $R_9$ is a straight- or branched-chain alkyl group that has at least 4 carbon atoms, and X denotes oxygen or —$CH_2$—.

3. The cationically polymerizable liquid composition according to claim 1, wherein the monofunctional monomer (A-1) is represented by formula (3) below,

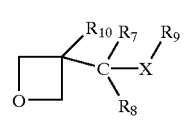

(3)

wherein,
    $R_7$, $R_8$ and $R_{10}$ denote hydrogen atoms or $C_1$ to $C_{10}$ alkyl groups, which may have a substituent, $R_9$ denotes a straight- or branched-chain $C_4$ to $C_{24}$ alkyl group, and X denotes an oxygen atom.

4. The cationically polymerizable liquid composition according to claim 1, wherein the polyfunctional monomer (A-2) is an epoxy resin containing at least two epoxy groups.

5. The cationically polymerizable liquid composition according to claim 1 wherein the polyfunctional monomer (A-2) contains at least two alicyclic epoxy groups.

6. The cationically polymerizable liquid composition according to claim 1, wherein the polyfunctional monomer (A-2) contains at least two oxetanyl groups.

7. The cationically polymerizable liquid composition according to claim 1, wherein the polyfunctional monomer (A-2) is 3,4-epoxycyclohexylmethyl-3',4'-epoxycyclohexanecarboxylate.

8. The cationically polymerizable liquid composition according to claim 1, wherein the cationic polymerization initiator (A-3) is photo-latent or thermo-latent.

9. The cationically polymerizable liquid composition according to claim 1, wherein the solid resin (B) is a hydrogenated petroleum resin and/or a hydrogenated rosin resin.

10. The cationically polymerizable liquid composition according to claim 1, wherein the component A-2 is present at 5 to 50 wt % of the total amount of component A-1 plus component A-2.

11. The cationically polymerizable liquid composition according to claim 5, wherein the polyfunctional monomer having at least two alicyclic epoxy groups (A-2) is present at 1 to 30 wt % of the total amount of component A-1 plus component A-2.

12. The cationically polymerizable liquid composition according to claim 1, wherein the latent cationic polymerization initiator (A-3) is present at 0.01 to 5 wt % of the total amount of component A-1 plus component A-2.

13. The cationically polymerizable liquid composition according to claim 1, wherein the solid resin (B) is present at 10 to 300 parts by weight relative to 100 parts by weight of the cationically polymerizable mixture (A).

14. The cationically polymerizable liquid composition according to claim 1, wherein the complex modulus of elasticity (G*) at 100° C. of the polymer obtained by cationic polymerization satisfies the following condition:

G*>100,000 (measurement frequency: 0.1 Hz).

15. The cationically polymerizable liquid composition according to claim 1, wherein the glass transition temperature of the polymer obtained by cationic polymerization is 0° C. or below.

16. A tacky polymer obtained by cationic polymerization of a cationically polymerizable liquid composition comprising:

a cationically polymerizable mixture (A) comprising:
a monofunctional monomer (A-1) having in the molecule only one cyclic ether structure represented by formula (1) below, wherein n is 1;
a polyfunctional monomer (A-2) having in the molecule at least two cyclic ether structures represented by formula (1) below, wherein n is 0, and A-2 is an epoxidized product of a block copolymer produced by anionic polymerization of an ethylene compound and a diene compound; and a latent cationic polymerization initiator (A-3); and
a solid resin (B) that is a tackifier, is compatible with the above-mentioned mixture (A) at room temperature, has a softening point of at least 40° C., and is selected from the group consisting of a rosin resin, a modified rosin resin, a hydrogenated rosin resin, a terpene resin, a terpene phenol resin, an aromatic modified terpene resin, a $C_5$ or $C_9$ petroleum resin or a hydrogenated derivative thereof, and a chroman resin;

the composition having a viscosity at 25° C. of 20 Pa·sec or below,

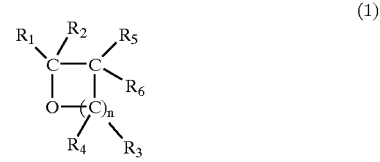

wherein, $R_1$ to $R_6$ independently denote hydrogen atoms or hydrocarbon groups, which may have a substituent, and the complex modulus of elasticity (G*) and the loss tangent (Tan δ) at 25° C. of the polymer obtained by cationic polymerization satisfy the following conditions, G*>100,000 (measurement frequency: 0.1 Hz), G*<4,000,000 (measurement frequency: 1 Hz), G*>2,000,000 (measurement frequency: 100 Hz), and Tan δ is at least 0.8 (measurement frequency: 100 Hz).

* * * * *